Jan. 6, 1970         J. P. LOMBARDI         3,487,537
   METHOD FOR MAKING A SPIRAL SEAMED CORRUGATED
        LAMINATED PIPE WITH UNCORRUGATED INTERIOR
Original Filed April 6, 1965                2 Sheets-Sheet 1
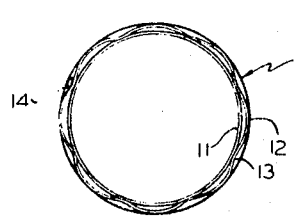
Fig. 1
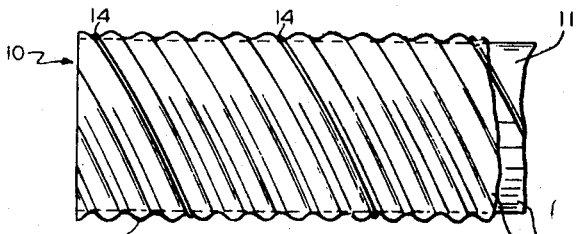
Fig. 2
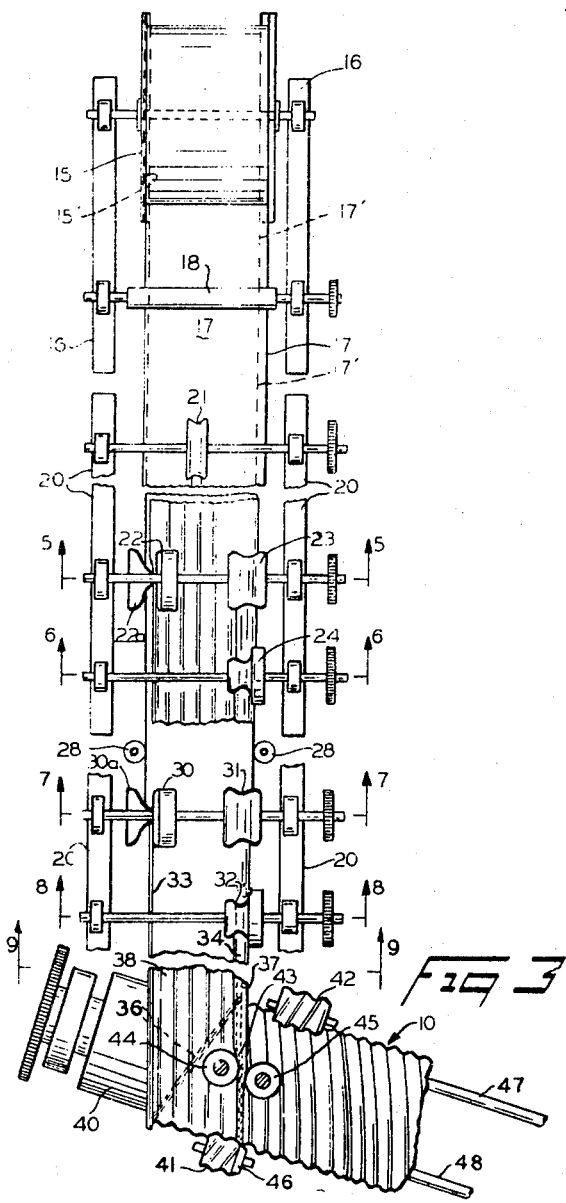
INVENTOR.
JACK P. LOMBARDI Jan. 6, 1970　　　J. P. LOMBARDI　　　3,487,537
METHOD FOR MAKING A SPIRAL SEAMED CORRUGATED
LAMINATED PIPE WITH UNCORRUGATED INTERIOR
Original Filed April 6, 1965　　　　　　　2 Sheets-Sheet 2

INVENTOR.
JACK P. LOMBARDI

United States Patent Office 3,487,537
Patented Jan. 6, 1970

3,487,537
METHOD FOR MAKING A SPIRAL SEAMED CORRUGATED LAMINATED PIPE WITH UN-CORRUGATED INTERIOR
Jack P. Lombardi, Duguid Road, Manlius, N.Y. 13104
Original application Apr. 6, 1965, Ser. No. 445,966, now Patent No. 3,340,901, dated Sept. 12, 1967. Divided and this application June 1, 1967, Ser. No. 642,939
Int. Cl. B21d *13/04;* B21h *7/00*
U.S. Cl. 29—477.7        4 Claims

ABSTRACT OF THE DISCLOSURE

The webs for forming inner and outer layers of the pipe are separately provided with seam-forming locking flanges at either edge and the outer layer web is corrugated. The webs are then superimposed, one on the other with the flanges aligning the webs. The now-laminated web is then rolled on a mandrel so that the laminated flange on one side of the laminated web of one turn of web is engaged with the laminated flange on the other side of the web of the preceding turn of web and the interengaged laminated flanges are secured together.

CROSS REFERENCES TO RELATED APPLICATIONS

This application is a division of copending application Ser. No. 445,966 of the same inventor filed Apr. 6, 1965, and now U.S. Patent 3,340,901 granted Sept. 12, 1967 and is an improvement of the method described in U.S. Patent 3,263,321 to Jack P. Lombardi, dated Aug. 2, 1966.

BACKGROUND OF THE INVENTION

This invention relates to a spiral seamed laminated pipe with corrugated outer layer and uncorrugated inner layer together with a method for fabricating the same.

Corrugated pipe is widely used for culverts and other drainge pipe because of its strength. Because of its corrugations, however, water does not drain entirely from the pipe, resulting in corrosion of the pipe.

Corrugated pipe with uncorrugated liner has heretofore been made by first fashioning the corrugated pipe and subsequently securing an uncorrugated liner, usually in a trough-like configuration, within the corrugated pipe. Such pipe is unsatisfactory in that the trough-like interior must be at the bottom of the pipe when it is used and the uncorrugated interior when it is secured to the corrugated exterior at spaced intervals has little more strength than the unlined exterior layer.

SUMMARY

The present invention contemplates a spirally wound laminated pipe in which the corrugated outer layer and uncorrugated inner layer are secured together along a spiral seam in a unitary whole in which the inner layer extends completely around the interior of the pipe and the outer layer extends completely around the exterior of the pipe. Inner and outer layers are locked together and locked to one another along the helically extending seam to give strength to the resulting product.

The principal object of the invention, accordingly, is to provide a corrugated pipe having an uncorrugated inner wall so that drainage through the inside may be complete.

Another important object is to provide a method for fabricating such pipe.

A further object is to provide a spirally wound laminated pipe with corrugated exterior and uncorrugated interior in which the interior lamination extends continuously around the interior of the pipe and the outer corrugated layer completely encloses the interior layer.

A still further object is to provide a method for fabricating a spirally wound laminated pipe having a spirally extending locking seam, and having a corrugated outer layer completely enclosing an uncorrugated inner layer which extends completely around the interior of the pipe.

Other objects and advantages will appear from the following description in conjunction with the appended drawings, in which:

BRIEF DESCRIPTION OF THE DRAWINGS

FIGURE 1 is an end view and FIGURE 2 is a fragmentary side elevational view of a section of pipe according to the invention;

FIGURE 3 is a diagrammatic fragmentary plan view of apparatus for the fabrication thereof;

FIGURE 4 is a diagrammatic fragmentary side elevational view of a portion of the apparatus of FIGURE 3;

FIGURE 14 is a fragmentary plan view of the mandrel showing welding means for forming the spiral seam;

DESCRIPTION OF THE PREFERRED EMBODIMENTS

Figure 5:
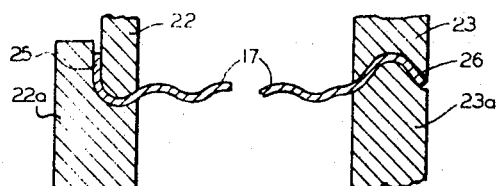
FIGURES 5 and 6 are enlarged diagrammatic fragmentary sectional views of the upper layer of the web on the lines 5—5 and 6—6, respectively, of FIGURE 3.

In FIGURES 1 and 2 are shown a laminated corrugated pipe 10 having an inner uncorrugated layer 11 and an outer corrugated layer 12. The pipe 10 is spirally wound, both inner and outer layers of the laminated sidewall 13 being joined, as will hereinafter appear, along a spirally extending seam 14, one edge of each turn of the laminated side wall web being locked to the web of the adjacent turn by the seam 14.

In FIGURES 3 and 4, apparatus is diagrammatically shown illustrating the method of fabrication of the pipe 10.

Two reels 15 and 15' are supported, one above the other, on suitable shafts journalled on the frame 16. Elongated strips 17 and 17' of sheet metal are drawn from the reels over suitable aligning rolls 18 and 18' and fed to forming rolls journalled on a mill frame 20 (FIG. 1) aligned with the reel frame 16.

Figure 6:
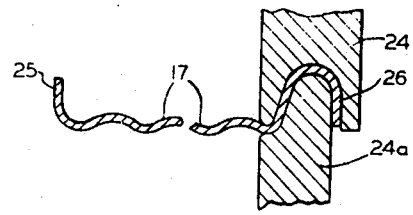

A series of corrugating rolls 21 are provided on frame 20 for the strip 17 and beyond the corrugating rolls, edge forming rolls 22 and 22a, 23 and 23a, and 24 and 24a are provided for forming locking flanges on the edges of the now corrugated strip 17. As best seen in FIGURES 5 and 6, the forming rolls 22 and 22a provide the strip 17 with an upturned male locking flange 25 at one edge of the strip in a manner more fully described in my copending application Ser. No. 351,352, filed Mar. 12, 1964. Edge forming rolls 23, 23a, 24 and 24a form a downwardly facing female locking flange 26 at the other edge of the strip 17 in a two-step operation.

As best seen in FIGURE 1, strip 17' below strip 17 is somewhat narrower to allow for the narrowing effect of the corrugating operation on strip 17 and, as seen in FIGURE 4, support rolls 27 journalled on frame 20 are provided for carrying strip 17' under the corrugating mill for strip 17.

Figure 7:
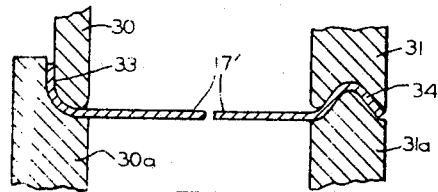
FIGURES 7 and 8 are enlarged diagrammatic fragmentary sectional views of the lower layer of the web on the lines 7—7 and 8—8, respectively, of FIGURE 3.
Figure 8:
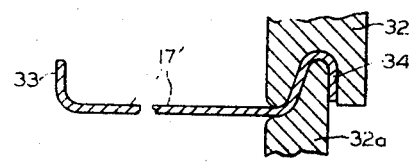

Alignment rollers 28 are provided for the strip 17' for precisely aligning the strip with respect to upper strip before it enters the edge forming rolls 30, 30a, 31, 31a, 32 and 32a which are supported on frame 20 for the lower strip. As best seen in FIGURES 7 and 8, the rolls 30 and 30a form an upwardly projecting male locking flange 33 on the edge of strip 17' underneath the flange 25 of the upper strip and rolls 31, 31a, 32 and 32a provide a downwardly facing female locking strip 34 at the opposite edge of the strip in a two-step operation.

Figure 9:
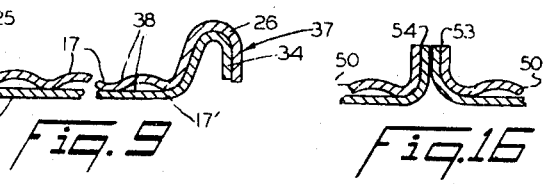
FIGURE 9 is an enlarged diagrammatic fragmentary sectional view of the web on the line 9—9 of FIGURE 3.

After passing through the edge forming rolls the lower strip 17' is guided upward toward the strip 17 by a chute 35 as indicated in FIGURE 4. As indicated in FIGURE 9, when the formed strip 17' meets the corrugated strip 17, the female flange 34 engages in the flange 26 of the upper strip to form a laminated female flange 37. The strip widths are so predetermined and the edge forming rolls so located that when the female flanges interlock, the male flanges 33 and 25 interengage at the other edge to form a laminated male locking flange 36 and the engaged strips 17 and 17' form a laminated web 38 whose upper layer is corrugated and lower layer is not.

Figure 10:
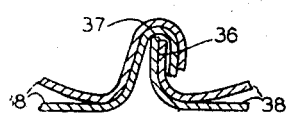
FIGURES 10, 11, 12 and 13 are enlarged diagrammatic fragmentary sectional views illustrating successive steps in forming the locking seam on the mandrel.

Just as described in my copending application hereinabove referred to, the laminated web 38 is then wound over a rotating mandrel 40 which is disposed at an angle to the path of travel of the web 38. As the web 38 makes one complete turn about mandrel 40, the flange 36 which projects outwardly of the mandrel enters the inwardly facing female flange 37 of the succeeding turn of the web continuously, as the web is turned on the mandrel in a manner illustrated diagrammatically in FIGURE 10.

Rollers 41 and 42 are supported, by means not shown, around the mandrel 40 and have a conformation matching that of the corrugated outer layer 17 of the web. Rollers 41 and 42, and another not seen in FIG. 3, are driven, by means not shown, so as to act like gears to drive the formed pipe 10 axially of mandrel 40 as it is formed.

Figure 11:
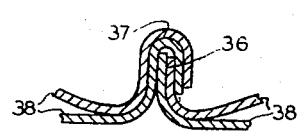

Web 38, as it is continuously drawn on to the mandrel 40, therefore, has, at 43, a point where flange 36 of one turn is continuously entering the inwardly facing flange 37 of the next turn, and immediately beyond this point a pair of rollers 44, 45, also supported, by means not shown, adjacent mandrel 40, pinch the sides of flange 37 together against the interengaged flange 36, as shown diagrammatically in FIGURE 11.

Figure 12:
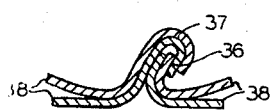
Figure 13:
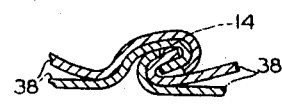

Roller 41 is provided with a tapered end 46 which knocks the now locked-together flanges 36 and 37 over toward one side as illustrated in FIGURE 12, and another roller such as roller 42 forces the locked-together flanges down against the web 38 to form the now double-locked seam 14.

The now formed pipe 10 is supported on axially extending rollers 47, 48 as it comes off the mandrel 40 and may be cut into any desired length by appropriate means such as a torch.

It will be apparent that the corrugated outer layer 17 and the uncorrugated layer 17' are locked together at the lock seam joint 14 and each turn of the side wall web is locked to the adjacent turn forming a unitary and rigid pipe. While inner and outer layers are in contact only at the valleys of the corrugations, as shown in FIGURE 9, and at the seam 14, the pipe side wall is in two layers. The outer corrugated layer extends completely around the outside of the pipe, including the seam 14, and the uncorrugated inner layer likewise extends completely around the inside of the pipe. When installed in a culvert, for example, no pockets are formed by corrugations within the pipe and drainage may be complete.

It will also be apparent that either the outer corrugated layer or the inner layer may be formed as a double layer, by means described in my aforesaid copending application thereby providing a pipe with a third intermediate layer of sheet material, or the intermediate layer may be of material other than metal such as tarpaper. Alternatively, suitable plastic material may be applied between the inner and outer layer as the strip 17 rises on chute 35 to fill the spaces between layers formed by the hills of the corrugation in the outer layer.

Similar apparatus and method may be used to form a pipe 10a with a spiral welded seam as illustrated in FIGURE 14. Since welding the seam eliminates the necessity for interlocking hooks male locking flanges are provided at either side of the web.

Referring again to FIGURES 3 and 4, the edge forming rolls 23, 23a, 24 and 24a are replaced with a pair of male flange forming rolls similar to the rolls 22 and 22a for the upper strip 17. Rolls 31, 31a, 32 and 32a are replaced by a single pair of rolls similar to rolls 30 and 30a for the strip 17'.

Figure 15:
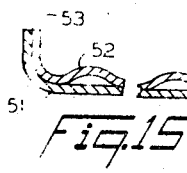
FIGURE 15 is a sectional view similar to FIGURE 9 showing a laminated web for use with the welded seam.

When the chute 35 guides the lower strip into engagement with the upper strip a laminated web 50 is formed as shown in FIGURE 15 having an uncorrugated lower layer 51 and a corrugated upper layer 52. At either side of the web the male flanges project upward interlocking the web as shown and forming laminated flanges 53 and 54.

When the web 50 is wound around the mandrel 40, as shown in FIGURE 14, the laminated flanges 53 and 54 project radially of the mandrel. A plurality of rollers 55 guide the web 50 and force it against the mandrel. Rollers 55 are supported, by means not shown, independent of the mandrel, are corrugated to mesh with the outer layer of web 50, and are driven to force the pipe 10a axially of the mandrel as described above in connection with the fabrication of the pipe 10.

Figure 16:
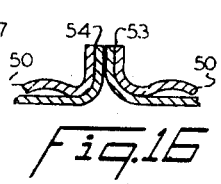
FIGURE 16 is a sectional view similar to FIGURE 10 showing the locking flanges of adjacent turns on the mandrel prior to welding the seam.

The angle at which mandrel 40 is disposed to the line of travel of web 50, as it comes from the forming mill, is such that the laminated flange 53, as web 50 is wrapped around the mandrel, comes up against the flange 54 of the succeeding turn of the web around the mandrel at a point denoted 56 in FIGURE 14. The laminated flange 54 of one turn abuts the laminated flange 53 of the preceding turn of the web in side-by-side manner as shown in FIGURE 16.

A pair of pinch rolls 57—57 force the abuting flanges 54 and 53 together immediately beyond the point 56 and an electrode 58, shown fragmentarily in FIGURE 14 is directed toward the pressed-together flanges 54 and 53 as they emerge from between rolls 57—57. Both the pair of rolls 57—57 and the electrode 58 are supported independently of the mandrel 40 and the electrode 58 may be a portion of an electron beam welding unit, or a shielded arc method of welding may be used.

After the welded flange 54–53 is beaded together by the welding means it is carried around the mandrel 40 and cools becoming the welded spiral seam 60 of the pipe 10a.

The welded pipe is continuously forced axially of the mandrel as described above and after it has left the mandrel the pipe is cut into suitable lengths.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A method of making laminated pipe comprising the steps: drawing two strips of formable sheet material from separate reels, feeding one strip to a corrugating mill, the corrugating mill including edge forming rolls and simultaneously feeding the other strip past the corrugating mill to other edge forming rolls, forming on each strip with said edge forming rolls a male locking hook along one edge of each strip and a female locking hook along the other edge of each strip, guiding the hooked strips together for forming a layered web with male hooks projecting side-by-side along one edge and female hooks interfitted along the other edge, winding the web helically on a mandrel and at the same time engaging the male hooks at one side of the web in the female hooks at the opposite side to form a helical lock seam, and at the same time continuously sliding the helically formed pipe axially along the mandrel.

2. A method of making laminated pipe, comprising the steps: drawing two strips of formable sheet material from separate reels, feeding one strip to a corrugated mill, the mill including edge forming rolls, and simultaneously feeding the other strip past the corrugating mills to other edge forming rolls, continuously forming with said edge forming rolls locking flanges on each strip along each edge of each strip, then guiding the flanged strips together for forming a layered web with the locking flanges of the two strips projecting from the web interengaged to form laminated flanges at each edge of the web, then continuously winding the web helically on a mandrel and at the same time bringing together the laminated flange at one side of the web as it first meets the mandrel with the adjacent flange of the preceding turn of the web about the mandrel and continuously forming the brought-together laminated flanges into a locking seam which thereafter extends helically of the pipe, and at the same time sliding the helically formed pipe axially along the mandrel.

3. A method of making laminated pipe with corrugated outside layer and uncorrugated inside layer, comprising the steps: continuously feeding two strips of sheet metal onto vertically spaced forming mills, the upper mill having corrugating rolls and thereafter edge forming rolls, the lower mill having only edge forming rolls; forming along one edge of each strip an upwardly projecting male locking hook and along the opposite edge of each strip a downwardly facing female hook, the hooked strips being of substantially equal width when formed; guiding the hooked strips together thereby forming a layered web with male hooks projecting side-by-side along one edge and female hooks interfitted along the opposite edge; guiding the web around a rotating mandrel disposed at an angle to the direction of travel of the layered web; winding the layered web helically around the mandrel to engage the male hooks at one side of the web in the open end of the interfitted female hooks at the other side; then continuously pinching the sides of the overlapped female hooks together in close contact with the engaged male hooks to form a locking seam while the web is wound on the mandrel; then bending the pinched together seam over toward the outer end of the female hook and against the helically wound web to lock the web into a formed pipe; and at the same time sliding the pipe as it is formed axially along the mandrel.

4. A method of making laminated pipe with corrugated outside layer and uncorrugated inside layer, comprising the steps: continuously feeding two strips of sheet metal onto vertically spaced forming mills, the upper mill having corrugating rolls and thereafter edge forming rolls, the lower mill having only edge forming rolls; forming along each edge of each strip an upwardly projecting locking flange, the lower flanged strip having a width exceeding the width of the upper flanged strip by twice the thickness of the sheet metal of the lower strip, guiding the flanged strips together thereby forming a layered web with a laminated flange at each side; thereafter continuously guiding the web around a rotating mandrel disposed at an angle to the direction of travel of the layered web, winding the web helically around the mandrel to engage the laminated flange on one side of each turn of the web about the mandrel against the adjacent flange of the succeeding turn on the other side of the web, while continuously welding the engaged flanges together to form a spiral seam, and at the same time sliding the pipe as it is formed axially along the mandrel.

References Cited

UNITED STATES PATENTS 1,580,760    4/1926    Palmer _____ 29—202.5 X
3,263,321    8/1966    Lombardi _____ 29—429

JOHN F. CAMPBELL, Primary Examiner

RONALD J. SHORE, Assistant Examiner

U.S. Cl. X.R.

29—202.5, 429; 228—15

PO-1050
(5/69)

UNITED STATES PATENT OFFICE
CERTIFICATE OF CORRECTION

Patent No. 3,487,537        Dated January 6, 1970

Inventor(s) Jack P. Lombardi

It is certified that error appears in the above-identified patent and that said Letters Patent are hereby corrected as shown below:

Claim 2, Column 5, line 17, for "corrugated" read --corrugating--; Column 5, line 19, for "mills" read --mill--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents